Dec. 4, 1951     T. J. PEUKERT     2,577,358
LIQUID LEVEL CONTROL FOR VOLATILE LIQUIDS
Filed Sept. 15, 1947     3 Sheets-Sheet 1
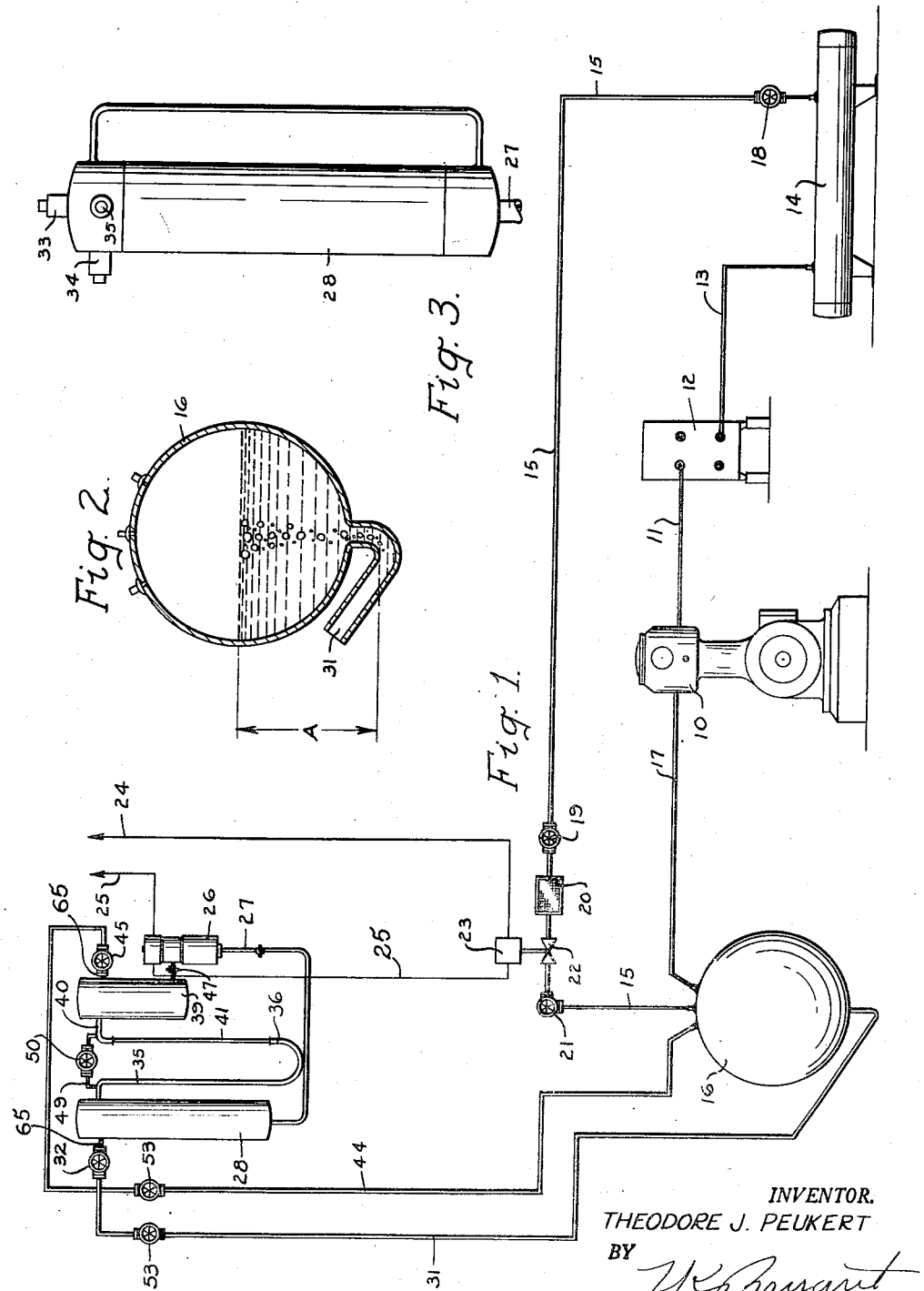
INVENTOR.
THEODORE J. PEUKERT
BY Dec. 4, 1951 T. J. PEUKERT 2,577,358
LIQUID LEVEL CONTROL FOR VOLATILE LIQUIDS
Filed Sept. 15, 1947 3 Sheets-Sheet 2

INVENTOR.
THEODORE J. PEUKERT
BY

Dec. 4, 1951     T. J. PEUKERT     2,577,358
LIQUID LEVEL CONTROL FOR VOLATILE LIQUIDS

Filed Sept. 15, 1947     3 Sheets-Sheet 3

INVENTOR.
THEODORE J. PEUKERT
BY

Patented Dec. 4, 1951

2,577,358

UNITED STATES PATENT OFFICE 2,577,358

LIQUID LEVEL CONTROL FOR VOLATILE
LIQUIDS

Theodore J. Peukert, Los Angeles, Calif.

Application September 15, 1947, Serial No. 774,041

15 Claims. (Cl. 62—8)

1

This invention relates to liquid level controls for controlling the depth of volatile liquid contained in a system for utilizing such liquid and more particularly to remote controls for controlling liquid levels of refrigerant liquids existing in refrigerating systems.

One important object of the present invention is to provide a remote control for the level of a liquid in a container wherein the vaporization of the liquid itself is utilized for cutting off the supply of liquid to the container when the contained liquid is at its desired limiting level.

Another object of the invention is to provide a controlling system for this purpose wherein the system is fully automatic and requires no supervision or adjustment while in use.

Another feature of the invention is the provision of a liquid level control wherein the controlled liquid level can be easily and readily changed or adjusted so as to carry the operating level of the liquid at any desired height within the range of the system.

A further object of the invention is to provide a novel liquid level control which operates under static conditions of liquid to control the level thereof without the use of any moving mechanism immersed in the liquid or inaccessible within the container holding the liquid.

A still further object of the invention is to provide a liquid level control remote from the vessel in which is contained the liquid the level of which is to be controlled whereby, for instance, in a refrigerating system the container holding such liquid may be located in a cold or freezing temperature while the controlling mechanism itself may be located in a warm and easily accessible position.

With the above and other objects in view as will be hereinafter apparent, the invention consists in general of certain novel details of construction and combinations of parts presently to be fully described, illustrated in the accompanying drawings and particularly claimed.

In the accompanying drawings like characters of reference indicate like parts in the several views, and:

Figure 1 is a semi-diagrammatic view of a refrigerating plant having a liquid level control for the level of the liquid in an evaporator chamber, the control embodying the principles of the present invention and utilizing volume chambers.

Figure 2 is a detail section through the evaporator used in the refrigeration system and showing a certain vapor pressure tube connected thereto.

2

Figure 3 is a detail elevation of one of the elements of the control and showing its mounting bracket.

Figure 4:
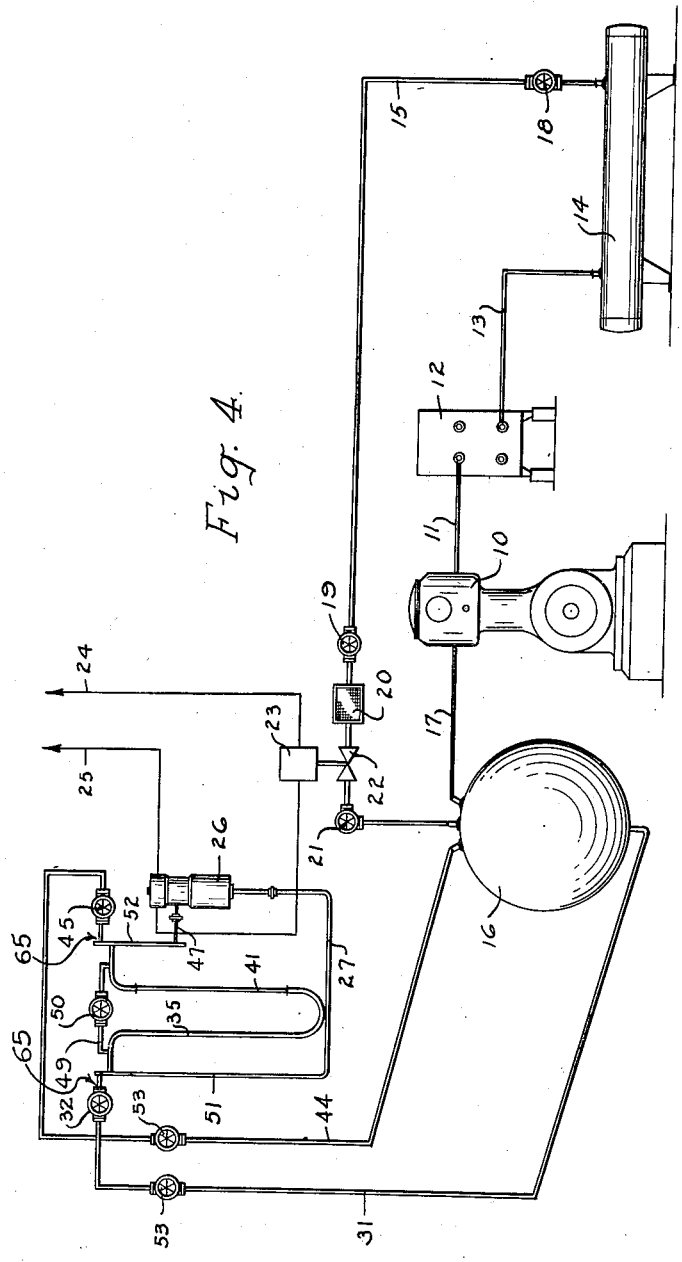

Figure 4 is a view similar to Figure 1 but showing a form of control without the use of volume chambers.

Figure 5:
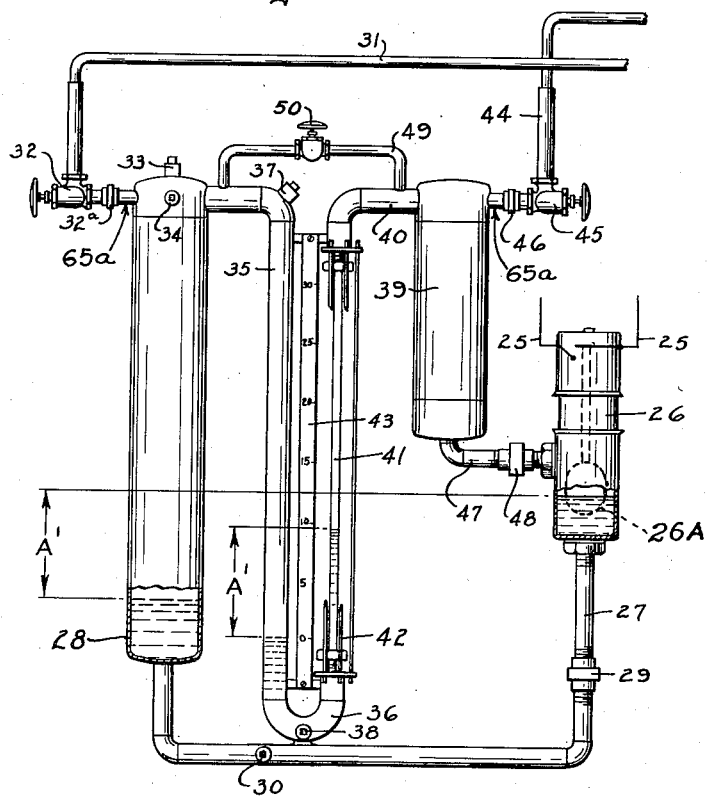

Figure 5 is an enlarged elevation, partly in section, and showing the liquid level control assembly.

Figure 6:
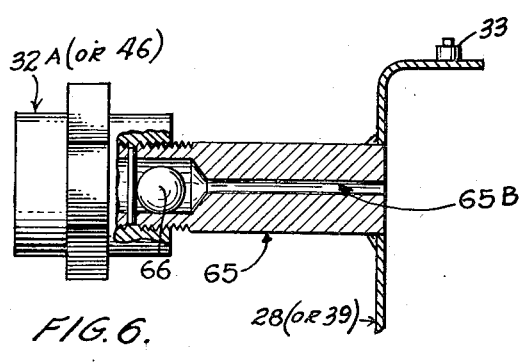

Figure 6 is an enlarged detail section showing a certain ball check used in connection with the apparatus of this invention.

In the embodiments of the invention as herein shown there is disclosed an engine driven compressor 10 from which a pipe line 11 extends to the intake side of a condenser 12. From this condenser a pipe 13 extends to a receiver 14 and from this receiver a pipe line 15 leads to an evaporator 16 which is in turn connected to the compressor 10 by a pipe 17. This is substantially the usual type of refrigeration system. In the pipe line 15 there is provided a main shut off or king valve 18 which is located adjacent the receiver 14 and further along in this line there are arranged an expansion valve 19, a strainer or filter 20 and a stop valve 21.

Likewise, in each of the forms shown there is located between the strainer 20 and valve 21 a valve 22 the opening and closing of which is controlled by a solenoid 23. This solenoid receives electric current from conductors 24 and 25 and in the latter is located a standard form of liquid level controlled electric switch 26 the details of which are not deemed necessary here to be shown.

The switch 26 forms part of the control assembly and in the form of the invention shown in Figures 1 and 5 the lower end of the switch is connected by a pipe 27 to the bottom end of a volume chamber 28. The pipe 27 is provided with one or more union connections 29 for convenience in assembling and dis-assembling and is also provided with a removable plug 30 in the control assembly. The top of the volume chamber 28 is connected to the bottom of the evaporator by a pipe 31 having a control valve 32 therein and provided with union connections as at 32a. The volume chamber has in its top a removable filler plug 33 so that necessary non-evaporable fluid at temperatures existing may be supplied to the assembly and the chamber may also have a connection 34 for the attachment of a pressure gage if desired. A pipe 35 extends laterally from the upper end of the volume chamber 28 and then downwardly to form a riser and has a U-bend 36 at its lower end. In the upper part of the pipe 35 there is fitted a filler plug 37 and in the U-bend there is provided a draw-off plug 38. At 39 is a second volume chamber which is considerably shorter than the volume chamber 28. The tops of the two volume chambers are on a level and because of its shortness the bottom of the chamber 39 is elevated above the bottom of chamber 28. The chamber 39 has a pipe 40 extending from its upper end laterally and downwardly so that its end is vertically alined above the end of the U-bend 36. A gage glass 41 is guarded by suitable guard wires 42 and is held between the pipes 35 and 40 to connect the same. A graduated scale 43 is supported from the pipes 35 and 40 and U-bend 36 to lie alongside of the gage glass. A pipe 44 connects the upper end of the chamber 39 with the top portion of the evaporator 16 and has the usual stop valves 45 and union connection 46. A pipe 47 and union 48 connect the lower end of the chamber 39 and the switch 26 somewhat above the bottom of the latter. The laterally extending portions of the pipes 35 and 40 are connected by a by-pass pipe 49 having a stop or equalizing valve 50 therein.

In the form of the invention shown in Figure 4 the volume chambers are not shown, the chamber 28 being replaced by a pipe 51 and the chamber 39 by a pipe 52. Otherwise the arrangements of piping and other parts is the same as that described in connection with the volume chambers. It is to be understood that in use volume chamber 28 (or pipe 51) is partly filled with oil or other non-evaporable medium. This oil flows into pipe 27 and, when equalizing valve 50 is open, comes to a desired common level in chamber 28 and pipe 27. Likewise, oil is placed in pipe 35 and flows into U-bend 36 coming to a new common level in the two legs of U-bend 36 of the liquid level gage. The desired liquid level in volume chamber 28 need not be the same as in U-bend 36. Each is filled to the level required to give the desired operating result.

In order to understand the operation of this apparatus let it be assumed that it is desired to maintain the liquid content of the evaporator 16 at a height A, as seen in Figure 2. The temperature of the evaporating liquid in the evaporator is controlled by the reduction of pressure in the upper and gas filled portion of the evaporator through the evacuation of the gas by the compressor 10. This temperature at the evaporator is normally lower than at any other point in a refrigerating system of the type shown. The temperature in the pipe 31, extending as it does away from the refrigerating system proper, is normally higher than the temperature of the evaporator. With the arrangement as shown in Figure 2 it will be plain that a small quantity of liquid refrigerant will be exposed to evaporation in the conduit 31. Since the pipe 31 opens into the top of the volume chamber 28 or pipe 51 and the lower part of these elements contains oil or other suitable liquid medium there can be no escape of gaseous refrigerant from the pipe 31 and its connections at the control assembly but such gas can escape only through the evaporator as indicated by the bubbles in Figure 2. In order to effect escape of the gas in this manner it must build up a pressure in the pipe 31 greater than that existing in the evaporator, this increase in pressure being directly equal to the static head A as shown in Figure 2. The same pressure will exist in the chamber 28 or pipe 51 as the case may be and this will tend to effect discharge of some of the liquid therefrom. However, through the connection of the pipe 27 with the lower non-evaporable fluid containing part of the float switch 26, a static head A' as shown in Figure 5 will be effected. It is here to be noted that the pipe 44 connects the top of the evaporator with the chamber 39 or pipe 52 and thus with the upper part of the float switch 26 so that pressure on the surface of the non-evaporable fluid in the float chamber will be equal to that in the upper part (gaseous pressure) in the evaporator 16. The static head created by the evaporating liquid in pipe 31 will increase the pressure in pipe 31 over that existing in pipe 44 and this difference in pressure will cause the level of the contained liquid in volume chamber 28 to fall, and the level in float chamber 26 to rise, resulting in a pneumatic-hydraulic pressure change to raise or lower the float as the liquid level varies in the refrigerant chamber. Valves 53 are not necessary to the functioning of the assembly, but when closed permit the assembly to be worked upon or removed.

If the liquid level in the evaporator 16 rises there will be an increase of pressure in the pipe 31 and consequently in the chamber 28. This will depress the liquid level in chamber 28 and raise the liquid level in the float chamber of switch 26, thus effecting opening of the switch and consequent de-energization of the solenoid 23 and closing of the valve 22 so as to shut off the supply of refrigerant to the evaporator. With the supply shut off the level of liquid in the evaporator will lower and the float switch will act to close the circuit and cause energization of the solenoid, putting valve 22 again in the open position to permit further supply of refrigerant to the evaporator.

In the same manner the level of the oil or other liquid medium in the riser 35 will be depressed and that in the gage glass will rise to establish the equivalent head A'.

If the quantity of oil or other fluid medium in the volume chamber 28 is increased then a lesser static head will be required to bring the level of the oil, or other medium, in chamber 26 to the height required to raise the float and operate and open the float switch, and the level of the refrigerant in the evaporator will be correspondingly lowered. Conversely, decreasing the amount of oil will necessitate greater static head to effect the operation of the float switch. Thus the refrigerant liquid level in the evaporator can be changed to suit the requirement necessary in particular operating conditions by simply adding or subtracting oil or other medium to or from that in the volume chamber 28 or pipe 51.

Furthermore, the extent to which the fluid medium rises in the gage glass being equal to the extent to which the fluid medium rises in the float valve, the gage glass can be used to check and determine changes in and regulate the height of liquid in the evaporator.

At the points indicated by the reference character 65a on Figure 5 of the drawings, check valves 65, such as are shown in Figure 6, are used at the connection piping between the system in which the liquid level is being controlled and the liquid level itself. The check valves are so set and connected that, upon breakage of the glass, ball 66 of the check valve will roll into position and automatically close the valve and prevent the escape of refrigerant from the system.

Normally, gas travel through the check valve 65 is slow and has no effect on the ball 66 of the check. If the gage glass 41 should be broken, there will be a rush of gas through the check valve 65, forcing the ball 66 of the check valve toward chamber 28 or 39 to seat the ball and closing the entrance passage 65b to the respective volume chamber.

It is to be particularly noted that the pipes 51 and 52 are the equivalent, for the purposes of this invention, of the volume chambers 28 and 39 and in the appended claims the terms "volume chambers" or "chambers" are to be read as to cover the pipes also.

It will be obvious from the above, that the pipes 31 and 44 may be of any desired length so that the control apparatus proper can be erected at any desired distance from and out of the chilling influence of the refrigerating means proper.

It will also be seen that the structure of the control assembly is of general U-shape, chamber 28 forming one leg, chamber 37 and float chamber 26 forming the other leg and the pipe 27 forming the connection between the legs. The gage arrangement is a form of U-shaped manometer pipe connected in parallel to the control assembly proper.

It is to be understood that the application of the above liquid level control is for convenience of illustration shown as using the electrical type of float operated switch, but that its use is not confined to such switch, with its electrical circuit and solenoid valve.

A float operated arrangement with mechanical linkage to the refrigerant control valve, an arrangement using air pressure giving pneumatic connection between the float and the valve or any other convenient arrangement may be used instead.

What is claimed is:

1. Means for controlling the level of a volatile liquid in a chamber forming part of a circulatory system and including a pipe supplying fluid to said chamber and a valve controlling said pipe, a substantially U-shaped controlling system having one leg conduit connected by a gas filled conduit to the bottom of said chamber and its other leg conduit connected by a gas filled conduit to the top of said chamber, said last leg including a float, said legs having a liquid pressure transmitting medium in their joined lower parts, and means controlled by said float and including operating means for said valve.

2. A liquid level control for an evaporator of a refrigerating apparatus including a pipe having a valve and supplying fluid to said evaporator, of means connected to said valve for operating the same, a substantially U-shaped controlling system having a liquid pressure transmitting medium in the lower parts and connecting portions of its legs, one of said legs having a gas filled pipe connection to the lower part of the evaporator below the liquid level in the evaporator and forming a trap for liquid refrigerant adjacent the evaporator, the other of said legs having a gas filled pipe connection to the top of said evaporator and including a float control for said valve operting means, and in combination means to supply additional medium to and draw off medium from said legs.

3. Means for controlling the level of a volatile liquid in a chamber forming part of a circulatory system and including a pipe supplying fluid to said chamber and a valve controlling said pipe, a substantially U-shaped controlling system having one gas filled leg conduit connected to the bottom of said chamber and its other leg conduit connected to the top of said chamber, said last leg including a float, said legs having a liquid pressure transmitting medium in their joined lower parts, and including operating means for said valve actuated by the float at a point remote therefrom, and in combination a U-shaped manometer connected in parallel to the upper ends of said legs.

4. Means for controlling the level of a volatile liquid in a chamber forming part of a circulatory system and including a pipe supplying fluid to said chamber and a valve controlling said pipe, a substantially U-shaped controlling system having one leg gas filled conduit connected to the bottom of said chamber and its other leg gas filled conduit connected to the top of said chamber, said last leg including a float, said legs having a liquid pressure transmitting medium in their joined lower parts, and including operating means for connecting said float and said valve, means to supply additional medium to and draw off medium from said legs, and in combination a U-shaped manometer connected in parallel to the upper ends of said legs.

5. A liquid level control for an evaporator of a refrigerating apparatus including a pipe having a valve and supplying fluid to said evaporator, of means connected to said valve for operating the same, a substantially U-shaped controlling system having a liquid pressure transmitting medium in the lower parts and connecting portions of its legs, one of said legs having a gas filled pipe connection to the bottom of the evaporator and forming a trap for liquid refrigerant adjacent the evaporator, the other of said legs having a gas filled pipe connection to the top of said evaporator and including a float controlling said valve operating means, means to supply additional medium to and draw off medium from said legs, and in combination a U-shaped manometer connected in parallel to the upper ends of said legs.

6. A liquid level control for an evaporator of a refrigerating apparatus including a pipe having a solenoid valve and supplying fluid to said evaporator, a vertically elongated volume chamber, a gas filled pipe leading from the bottom of said evaporator to the upper end of said chamber, a second vertically elongated volume chamber, a gas filled pipe leading from the top of said evaporator to the upper end of the second chamber, a float chamber having a float therein, a pipe connecting the lower end of said second chamber with the upper part of the float chamber, a pipe connecting the lower ends of said first and float chambers, said last mentioned pipe and the lower parts of its connected chamber being provided with pressure transmitting liquid, and electrical connecting means from said float for controlling said solenoid valve.

7. A liquid level control for an evaporator of a refrigerating apparatus including a pipe having a valve and supplying fluid to said evaporator, a vertically elongated volume chamber, a gas filled pipe leading from the bottom of said evaporator to the upper end of said chamber, a second vertically elongated volume chamber, a gas filled pipe leading from the top of said evaporator to the upper end of the second chamber, a float chamber having a float therein, a pipe connecting the lower end of said second chamber with the upper part of the float chamber, a pipe connecting the lower ends of said first and float chambers, said last mentioned pipe and the lower parts of its connected chamber being provided with pressure transmitting liquid, and electrical means operated by the float for controlling said valve.

8. A liquid level control for an evaporator of a refrigerating apparatus including a pipe having a valve and supplying fluid to said evaporator, a vertically elongated volume chamber, a gas filled pipe leading from the bottom of said evaporator to the upper end of said chamber, a second vertically elongated volume chamber, a gas filled pipe leading from the top of said evaporator to the upper end of the second chamber, a float in a float chamber controlling an electric circuit closer, a pipe connecting the lower end of said second chamber with the upper part of the float chamber, a pipe connecting the lower ends of said first and float chambers, said last mentioned pipe and the lower parts of its connected chamber being provided with pressure transmitting liquid, electro-magnetic means in circuit with said circuit closer and controlling said valve, and in combination a U-shaped manometer having the upper ends of its legs connected to the upper ends of said volume chambers.

9. A liquid level control for an evaporator of a refrigerating apparatus including a pipe having a valve and supplying fluid to said evaporator, a vertically elongated volume chamber, a gas filled pipe leading from the bottom of said evaporator to the upper end of said chamber, a second vertically elongated volume chamber, a gas filled pipe leading from the top of said evaporator to the upper end of the second chamber, a float chamber, a float therein, an electric circuit closer operated by the float, a pipe connecting the lower end of said second chamber with the upper part of the float chamber, a pipe connecting the lower ends of said first and float chambers, said last mentioned pipe and the lower parts of its connected chamber being provided with pressure transmitting liquid, electro-magnetic means in circuit with said circuit closer and controlling said valve, and in combination a U-shaped manometer having the upper ends of its legs connected to the upper ends of said volume chambers.

10. A liquid level control for an evaporator of a refrigerating apparatus including a pipe having a valve and supplying fluid to said evaporator, a vertically elongated volume chamber, a gas filled pipe leading from the bottom of said evaporator to the upper end of said chamber, a second vertically elongated volume chamber, a gas filled pipe leading from the top of said evaporator to the upper end of the second chamber, a float chamber, a float therein, a float controlled electric circuit closer operated by the float, a pipe connecting the lower end of said second chamber with the upper part of the float chamber, a pipe connecting the lower ends of said first and float chambers, said last mentioned pipe and the lower parts of its connected chamber being provided with pressure transmitting liquid, a solenoid in circuit with said circuit closer, and a core for said solenoid connected to said valve and acting to open the valve upon energization of the solenoid.

11. A liquid level control means in combination with the evaporator of a refrigerating apparatus, including a pipe supplying refrigerant liquid to said evaporator and a valve controlling flow of refrigerant liquid in said pipe; electric operating means for said valve, a substantially U-shaped controlling tube system having the upper end of one leg connected by gas filled conduit to the lower part of said evaporator below the liquid level desired to be held in said evaporator and the upper end of the other leg connected by gas filled conduit to said evaporator above the liquid level desired to be held in said evaporator; the lower portions of the legs of said substantially U-shaped tube containing fluid, the level of the surfaces of said fluid in the two legs being responsive to the varying difference in pressure in the gas filled conduits connecting said legs to said evaporator, rising or falling in one leg as it falls or rises in the other and electrical contactor means controlled by the rise or fall of the liquid in one of said legs to operate said valve controlling the supply of refrigerant liquid to the evaporator.

12. A liquid level control means in combination with the evaporator of a refrigerating apparatus, including a pipe supplying refrigerant liquid to said evaporator and a valve controlling flow of refrigerant liquid in said pipe; a substantially U-shaped controlling system having the upper end of one leg connected by gas filled conduit to the lower part of said evaporator below the liquid level desired to be held in said evaporator and the upper end of the other leg connected by gas filled conduit to said evaporator above the liquid level desired to be held in said evaporator; the lower portions of the legs of said substantially U-shaped tube containing fluid, the level of the surfaces of said fluid in the two legs being responsive to the varying difference in pressure in the gas filled conduits connecting said legs to said evaporator, rising or falling in one leg as it falls or rises in the other and float operated electrical contacting means controlled by the rise or fall of the liquid in one of said legs to operate said valve controlling the supply of refrigerant liquid to the evaporator.

13. A liquid level control means in combination with a chamber forming a part of a circulatory system of a refrigerating apparatus, including a pipe supplying refrigerant liquid to said chamber and a valve controlling flow of refrigerant liquid in said pipe; electric operating means for said valve, a substantially U-shaped controlling system having the upper end of one leg connected by gas filled conduit to the lower part of said chamber below the liquid level desired to be held in said chamber and the upper end of the other leg connected by gas filled conduit to said chamber above the liquid level desired to be held in said chamber; the lower portions of the legs of said substantially U-shaped tube containing fluid, the level of the surfaces of said fluid in the two legs being responsive to the varying difference in pressure in the gas filled conduits connecting said legs to said chamber, rising or falling in one leg as it falls or rises in the other and electrical contactor means controlled by the rise or fall of the liquid in one of said legs to operate said valve controlling the supply of refrigerant liquid to the chamber.

14. A liquid level control means in combination with a chamber forming a part of a circulatory system of a refrigerating apparatus, including a pipe supplying refrigerant liquid to said chamber and a valve controlling flow of refrigerant liquid in said pipe; a substantially U-shaped controlling system having the upper end of one leg connected by gas filled conduit to the lower part of said chamber below the liquid level desired to be held in said chamber and the upper end of the other leg connected by gas filled conduit to said chamber above the liquid level desired to be held in said chamber; the lower portions of the legs of said substantially U-shaped tube containing fluid, the level of the surfaces of said fluid in the two legs being responsive to the varying difference in pressure in the gas filled conduits connecting said legs to said chamber, rising or falling in one leg as it falls or rises in the other and float operated electrical contacting means controlled by the rise or fall of the liquid in one of said legs to operate said valve controlling the supply of refrigerant liquid to the chamber.

15. A liquid level control means according to claim 14 having means for operating said valve to completely shut off flow therethrough and wherein said valve constitutes the sole means of communication between the portions of the pipe on opposite sides of the valve.

THEODORE J. PEUKERT.

REFERENCES CITED

The following references are of record in the file of this patent:

UNITED STATES PATENTS

| Number | Name | Date |
| --- | --- | --- |
| 1,805,901 | Bergdoll | May 19, 1931 |
| 1,838,165 | Vollmann | Dec. 29, 1931 |
| 1,862,657 | Breidenthal | June 14, 1932 |
| 2,266,069 | Phillips | Dec. 16, 1941 |
| 2,298,924 | Bichowsky | Oct. 13, 1942 |
| 2,344,245 | Grossman | Mar. 14, 1944 |